(No Model.)
A. H. MORRIS.
SCREW PROPELLER.
No. 464,033. Patented Dec. 1, 1891.
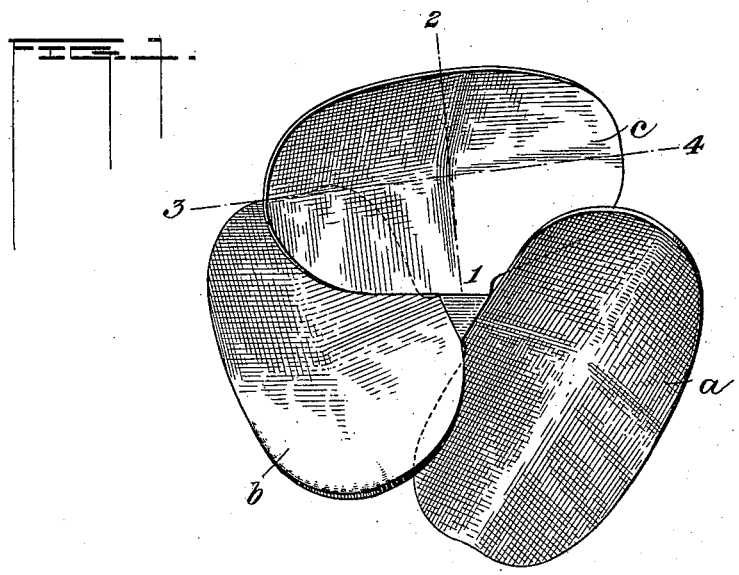
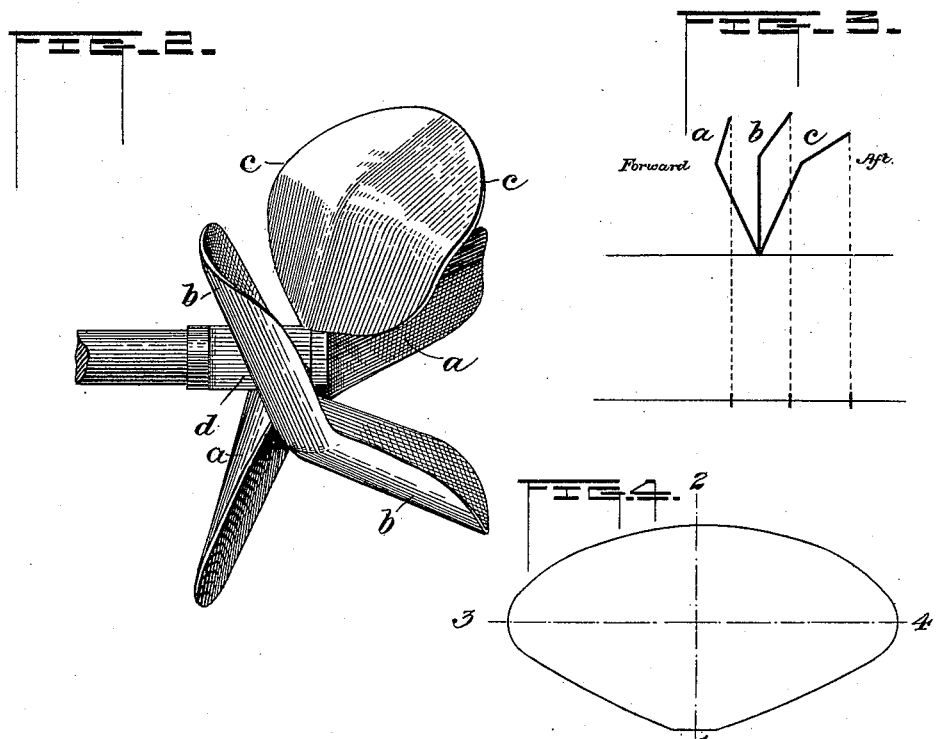
WITNESSES
INVENTOR
Albert H. Morris
by William B. Greeley
Atty

UNITED STATES PATENT OFFICE.

ALBERT H. MORRIS, OF BROOKLYN, NEW YORK.

SCREW-PROPELLER.

SPECIFICATION forming part of Letters Patent No. 464,033, dated December 1, 1891.

Application filed December 27, 1890. Serial No. 375,976. (No model.)

*To all whom it may concern:*

Be it known that I, ALBERT H. MORRIS, of Brooklyn, in the county of Kings and State of New York, have invented certain new and useful Improvements in Screw-Propellers, Fans, &c., of which the following is a specification.

The general object of my invention is to produce a propeller which shall do more work for a given consumption of power than the propellers now in use. To this general end I have sought, by arranging the blades of the propeller in relation to one another as hereinafter described, to increase in a measure the independence of the several blades and to make each blade act by itself without losing so much as usual of its efficiency on account of the action established in the surrounding fluid, whether water or air, by the other blades. I have further sought, by giving to the blades the general outline and relation to the shaft hereinafter described, to increase the aggregate effective area of the propeller. I have also sought, by giving to each blade the shape described, to diminish slip and to increase effective action.

While my improvements were intended, primarily, for propellers for vessels, they are equally applicable to rotary fans and blowers.

In the accompanying drawings, Figure 1 is a rear view of a propeller or fan embodying my improvements. Fig. 2 is a side view of the same. Fig. 3 is a diagram illustrating more clearly certain features, and Fig. 4 shows an outline of a blade.

The propeller or fan is composed of the several blades $a$, $b$, and $c$, preferably three in number. Each blade is substantially elliptical in outline, as represented, and is secured to the hub $d$ at the extremity of the minor axis 1 2 of the blade. Each blade is bent on or near its minor axis 1 2, so that the forward or leading half of the blade has a fine pitch and the other or following half a relatively rank pitch. Each blade is also bent on or near its major axis 3 4, so that the outer half inclines more aft than the inner half, as indicated in Fig. 3. Finally, the blades are so arranged on the hub that the leading or cutting edges of the blades move in different planes, as represented in Fig. 3, one blade $a$ being placed, for example, so that the inner half of its minor axis inclines forward, the second blade $b$ so that the inner half of its minor axis stands at substantially a right angle with the axis of the shaft, and the third blade $c$ so that the inner half of its minor axis inclines aft.

As will be seen from an inspection of Fig. 1, the outline and position of the blades makes the aggregate effective area of the blades substantially equal to the area of the full circle of rotation of the propeller, thus producing action upon the maximum body of water. The shape given to the blades has been found by experiment to give the best results, reducing slip and moving the whole body of surrounding fluid rearwardly with greater velocity. To this last result the arrangement of the blades so that their cutting-edges move in different planes contributes materially.

Fig. 4 represents a blade having about the proportions I have found best adapted for small propellers, the sides of the ellipse being substantially straight from points on the inside of the major axis to the point of attachment of the blade to the hub.

It will be understood that the blades are best manufactured separately and subsequently assembled upon and secured to the hub. The peculiar shape of the blades renders this desirable, as well as the convenience in replacing broken blades.

I claim—

1. A propeller composed of a series of blades, each blade of substantially elliptical outline and attached to the hub at one extremity of the minor axis of said blade, substantially as shown and described.

2. A propeller composed of a series of blades, each blade of substantially elliptical outline and attached to the hub at one extremity of the minor axis of said blade, the said blades being set with their minor axes at different angles with the axis of the shaft, each in its respective plane with said shaft-axis, substantially as shown and described.

3. A propeller-blade of substantially elliptical outline and bent substantially upon its minor axis, whereby the leading half of said blade has a fine pitch and the other half of said blade has a rank pitch, in combination with a hub, substantially as shown and described.

4. A propeller-blade of substantially elliptical outline and bent substantially upon its major axis, whereby the outer half of said blade is more inclined aft than the inner half, in combination with a hub, substantially as shown and described.

5. A propeller-blade bent substantially upon one axis, whereby the leading half of said blade has a fine pitch and the following half a rank pitch, and bent substantially upon the other axis, whereby the outer half of said blade inclines more aft than the inner half, in combination with a hub, substantially as shown and described.

In witness whereof I have hereunto set my hand.

ALBERT H. MORRIS.

Witnesses:
WILLIAM B. GREELEY,
EDWARD A. GREELEY.